(12) United States Patent
Haselsteiner et al.

(10) Patent No.: US 10,223,291 B2
(45) Date of Patent: Mar. 5, 2019

(54) SECURE EXECUTION OF NATIVE CODE

(75) Inventors: Ernst Haselsteiner, Graz (AT); Christian Kirchstaetter, Graz (AT)

(73) Assignee: NXP B.V., Eindhoven (NL)

( * ) Notice: Subject to any disclaimer, the term of this patent is extended or adjusted under 35 U.S.C. 154(b) by 1140 days.

(21) Appl. No.: 13/320,526

(22) PCT Filed: May 15, 2010

(86) PCT No.: PCT/IB2010/052160
§ 371 (c)(1),
(2), (4) Date: Nov. 17, 2011

(87) PCT Pub. No.: WO2010/134009
PCT Pub. Date: Nov. 25, 2010

(65) Prior Publication Data
US 2012/0059993 A1    Mar. 8, 2012

(30) Foreign Application Priority Data

May 18, 2009 (EP) .................................. 09160543

(51) Int. Cl.
| | | |
|---|---|---|
| G06F 12/14 | (2006.01) | |
| G06F 9/45 | (2006.01) | |
| G06F 21/51 | (2013.01) | |
| G06F 21/53 | (2013.01) | |
| G06F 8/41 | (2018.01) | |
| G06F 9/455 | (2018.01) | |
| G06F 9/445 | (2018.01) | |

(52) U.S. Cl.
CPC ............ *G06F 12/145* (2013.01); *G06F 8/437* (2013.01); *G06F 12/14* (2013.01); *G06F 21/51* (2013.01); *G06F 21/53* (2013.01); *G06F 9/44589* (2013.01); *G06F 9/45516* (2013.01); *G06F 2221/2149* (2013.01)

(58) Field of Classification Search
None
See application file for complete search history.

(56) References Cited

U.S. PATENT DOCUMENTS 6,128,774 A * 10/2000 Necula et al. ................. 717/146
6,321,323 B1 * 11/2001 Nugroho et al. ................. 712/34
(Continued)

FOREIGN PATENT DOCUMENTS

| | | |
|---|---|---|
| CN | 1324472 A | 11/2001 |
| GB | 2356469 A | 5/2001 |
| WO | 2007/008595 A2 | 1/2007 |

OTHER PUBLICATIONS

Interpreter (computing), 8 pages, wikipedia.com.*
(Continued)

*Primary Examiner* — Jared I Rutz
*Assistant Examiner* — Marwan Ayash

(57) ABSTRACT

A computing device comprises: a memory; a processor; an interpreter; and a Memory Management Unit. The interpreter is for controlling the processor to execute a program comprising at least one first instruction in a format that is not native to the processor and at least one second instruction in machine code that is native to the processor. The Memory Management Unit is adapted to control access by the processor to the memory and possibly also to peripherals when the at least one second instruction is executed.

9 Claims, 2 Drawing Sheets

(56) References Cited

U.S. PATENT DOCUMENTS

| | | | |
|---|---|---|---|
| 7,069,593 B1 | 6/2006 | Gerbault | |
| 7,353,343 B2 | 4/2008 | Yang | |
| 8,220,045 B2 | 7/2012 | Conti et al. | |
| 2002/0053072 A1* | 5/2002 | Steinbusch | G06F 9/381 717/148 |
| 2004/0123290 A1* | 6/2004 | Overton | G06F 9/45504 718/1 |
| 2004/0268332 A1 | 12/2004 | Mitsumori et al. | |
| 2005/0273605 A1* | 12/2005 | Saha et al. | 713/166 |
| 2009/0125885 A1* | 5/2009 | Gayathri | G06F 21/53 717/120 |
| 2009/0282474 A1* | 11/2009 | Chen et al. | 726/21 |
| 2010/0042983 A1* | 2/2010 | Vick | G06F 9/45516 717/153 |
| 2010/0082926 A1* | 4/2010 | Sahita | G06F 12/145 711/163 |
| 2010/0175104 A1* | 7/2010 | Khalid | G06F 9/545 726/1 |

OTHER PUBLICATIONS

International Search Report for Patent Application No. PCT/IB2010/052160 (dated Aug. 25, 2010).

"Sun 68000 Board User's Manual Revision B", Sun Microsystems Inc., 30 pgs., retrieved from the internet: Sep. 7, 2009 sun1.sunhelp.org/198302_sun_68000_board_users_manual_revb.pdf(Feb. 1, 1983).

"MC68030 ED—Motorola" MC68030 Enhanced 32-Bit Microprocessor User's Manual Third Edition, XP007909723, Prentice-Hall, pp. 1-89 (Jan. 1, 1990).

Correspondence from foreign counterpart patent appln. No. EP 09160543.6 (dated Oct. 9, 2014).

\* cited by examiner

SECURE EXECUTION OF NATIVE CODE

This invention relates to the execution of native code called from an interpreted program. It is particularly relevant to the execution of native machine code as part of a Java application; and more particularly to the execution of native code in a Java Card, .NET Smart Card or similar environment.

Native code, or machine code, refers to a machine dependent format for computer program code. Native code consists of instructions which can be executed directly by a given processor or computing architecture. Since the instruction sets of different processors are different, native code is not portable across different platforms.

One solution to the lack of portability of native machine code is to distribute programs in a generic form. Interpreted code is one such generic form. This is a machine-independent, and therefore portable, code. To run such code on a given processor, an interpreter is provided. This is a piece of software which translates the instructions of the interpreted code into the native code executed by the given processor.

Java is one prominent example of a programming language that is usually interpreted (rather than compiled directly to machine code). A Java compiler converts Java source code into Java bytecode, which is a machine-independent (non-native) code. To run this Java bytecode on a given platform, an interpreter called the Java Virtual Machine interprets the code and supplies corresponding machine code instructions to the processor. One drawback of the added portability of Java bytecode is a reduction in the speed of execution of the code. This is due in part to the need to perform the additional interpreting step at runtime and in part to the inability of the programmer to optimize the code for a specific processor, as would ordinarily be possible for native code.

Nonetheless, the portability of Java has made it popular in many applications. One such application is smart card technology. Smart cards, or chip cards are embedded integrated-circuit devices provided in a thin, flat, card-like form. They typically include at least a memory, but often also have microprocessor components which provide some processing capacity. They are used in a wide variety of applications: for example, contact smart-card technology is used in Subscriber Identity Module (SIM) cards in mobile telephony and in credit cards; contactless smart cards, based on Radio Frequency Identification (RFID) technology, are used in public transport payment systems and other electronic purse applications.

The Java Card Platform Specification, published by Sun Microsystems, has defined a subset of the Java language for implementation by smart cards. This provides a simplified subset of the features of the full Java language, which is appropriate to the limited processing and memory resources of the smart card environment. The ability to run Java-based programs on a smart card enables diverse software applications to run side by side on any smart card that supports the specification, regardless of the underlying processor architecture. This increases flexibility and interoperability, without significant burden on the application programmer.

However, the performance disadvantages associated with an interpreted code such as Java bytecode are especially undesirable in a constrained computing environment such as the smart card.

According to an aspect of the present invention there is provided a computing device comprising: a memory; a processor; an interpreter, for controlling the processor to execute a program comprising at least one first instruction in a format that is not native to the processor, the program calling at least one second instruction in machine code that is native to the processor; and a Memory Management Unit, adapted to control access by the processor to the memory when the at least one second instruction is executed and to prevent access to a portion of the memory allocated to the interpreter but not allocated to said second instruction.

The non-native code can be a machine independent code, such as Java bytecode. The native code is a machine-specific code, using the instruction set of the particular processor in question. Typically, the part of the program provided in the non-native interpreted code will call a function provided (for example, compiled) in native code so that the execution of that function can be accelerated and/or optimized for the particular processor in question. Thus, the instructions provided in native code may comprise a computationally intensive part of the program, such as an encryption function. The use of native code bypasses the interpreter temporarily, until control is handed back to the interpreted part of the program. However, this can introduce security risks, since the checking which the interpreter ordinarily performs when executing the interpreted (non-native) code on the processor cannot be performed on the native machine code. To reduce these security risks, a memory management unit (MMU) is provided, to control the access by the machine-code instructions to the memory. All memory accesses (for example, read and write operations) requested by the native instructions are handled via the MMU. In this respect, the MMU fulfills the memory protection role of the interpreter, when native code is being executed. In particular, native functions can be prevented from accessing parts of the memory other than those specifically allocated to the native functions by the non-native program which called them. In some embodiments of the invention, the MMU may not only control access to memory but possibly also to one or more peripherals of the system, like input/output devices or cryptographic co-processors. As the memory and optionally the peripherals are controlled, this can be considered to be a kind of "virtual native execution environment", since many of the advantages of pure native code are provided, while at the same time retaining a degree of control over the execution of the code. This can offer the security and reliability of the interpreted (virtual) environment with the speed and opportunity for optimized processing usually associated a native execution environment. Note that the MMU is a hardware device whereas the interpreter is a software component.

Preferably, the MMU is adapted to control access by the processor to the memory only when the at least one second instruction is executed.

In this way, the MMU is used for memory access or peripheral access only when it is needed for protection—that is, only when native code is executed. When non-native code is interpreted, the interpreter can perform protection and the MMU is redundant.

The interpreter may be a Java Virtual Machine and the at least one first instruction may comprise Java bytecode.

The computing device may be a Java Card smart card or any other Smart card with an interpreter, for example, Microsoft's .NET environment.

Such smart cards typically have heavily constrained memory and processor resources. Thus, it is particularly desirable that native code functions are available to improve execution speed. Nonetheless, Java cards may be used in applications where security is critical—such as credit cards or electronic wallet applications. Thus, it is also particularly beneficial to provide robust security, in order to prevent applications from interfering with one another, or the card operating system, and potentially compromising sensitive data or functions.

According to another aspect of the invention, there is provided a method of executing a program for a computing device comprising a processor and a memory, the program comprising at least one first instruction in a format that is not native to the processor and calling at least one second instruction in machine code that is native to the processor, the method comprising: interpreting the at least one first instruction using an interpreter and controlling the processor to execute the same; and executing the at least one second instruction using the processor, wherein access to the memory is controlled using an MMU, preventing access to a portion of the memory allocated to the interpreter but not allocated to said second instruction.

When the at least one first instruction is interpreted, its memory accesses can be managed in software, to provide memory protection. When the at least one second instruction is executed, the MMU provides memory protection, by acting as an intermediary between the processor, which is under the control of the native-code function, and the memory and optionally peripherals it wishes to access. In this way, the MMU acts as a kind of "hardware firewall", which protects the computing device from malicious or faulty native code.

The method may further comprise, before the step of executing the at least one second instruction: checking that a portion of the memory to be accessed by the at least one second instruction has been allocated to it; and storing in a configuration table of the MMU a mapping for that portion of the memory, which maps from a virtual address requested by the at least one second instruction to a physical address in the memory.

Before running the native code, a configuration table (for example, a lookup table) in the MMU can be initialized with information about the memory accesses and optionally peripheral accesses required by that code. When initializing this table, the operating system of the computing device can check whether each portion of memory and any peripheral referenced by the native code indeed belongs to the program and is meant to be accessed by the native code. For each such portion, provided the check is successful, a reference to the portion is added to the configuration table. This also establishes a correspondence between the memory-addressing format used by the native code and the physical address of the corresponding portion in the memory itself. Once this configuration table has been created, the MMU acts as a gateway to the memory and any peripherals—the native code can only access those addresses or peripherals which are present in the table. Therefore, the native code running in this "virtual native execution environment" is unable to access portions of the memory or peripherals owned by other software applications.

The step of executing the at least one second instruction may comprise accessing a portion of the memory using the MMU, wherein: the MMU translates from a virtual address requested by the at least one second instruction to the physical address of the portion in the memory, according to a mapping stored in a configuration table of the MMU; and access is denied by the MMU if the portion of the memory does not belong to the program or belongs to the program but has not been allocated to said at least one second instruction.

When the native code is being run, the MMU provides inherent memory protection as it translates memory access requests by the code to physical memory locations. If the native code should not have access to the requested memory (for example, because it belongs to an application other than the program which called it) then the MMU denies access. Even if the memory location has been assigned to the calling application, the MMU will deny access if the calling application has not allocated the memory to the called, native function. The same protection principles can also be applied to access to other resources of the computing device, such as peripheral devices.

The at least one first instruction may comprise Java bytecode and the step of interpreting the at least one first instruction may be performed by a Java Virtual Machine.

Also provided is a computer program, comprising computer program code means adapted to perform all the steps of the method, when said program is run on a computer.

There is also provided a computer program as described above, embodied on a computer readable medium.

The invention will now be described by way of example with reference to the accompanying drawings, in which.

Figure 1:
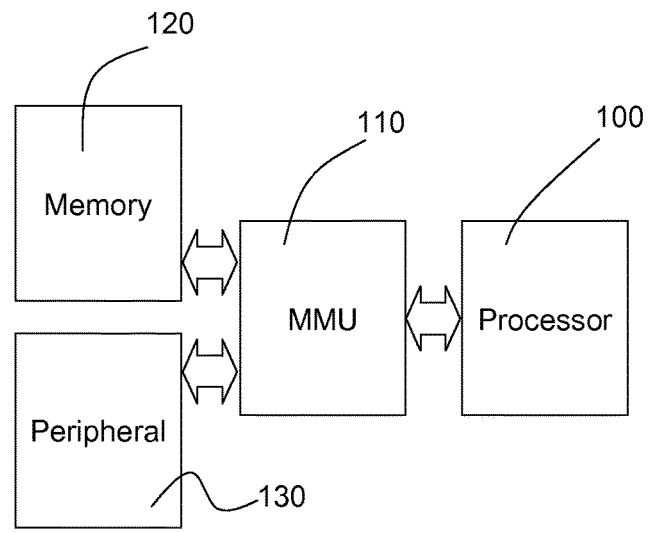
FIG. 1 is a block diagram of a computing device according to an embodiment.

Native code, comprising instructions in the machine code of the host processor, is executed directly by the processor of a computing platform and can therefore use any of the resources available on the platform. Software applications provided in native code can therefore cause malfunction of the whole platform and pose a potential security threat to other applications and the platform itself. For example, native code may read memory that is intended to be private, or may overwrite memory belonging to other applications, causing them to crash. The problems may be caused deliberately, when malicious code is introduced, or may arise accidentally, due to innocent programming errors.

In order to protect against these problems some operating systems make use of a hardware firewall to isolate different native applications from one another, and from the operating system itself. This hardware firewall is usually implemented by a Memory Management Unit (MMU). A different view of such hardware firewalls is to regard them as a virtualization. Each application gets its own, self-contained, virtual hardware platform (including at least memory but possibly also peripherals like cryptographic co-processors), which is isolated from other virtual hardware platforms as well as from the underlying physical platform.

Conventionally, hardware memory protection of this kind is unnecessary on interpreted platforms, such as Java-based computing devices. For Java applications, no hardware is needed to protect applications from one another or to protect the Java platform because—due to the nature of Java—it is impossible for a Java application to directly access any resources of the platform. Instead, all access to resources occurs through a further, intermediate layer of software. This is because Java is implemented as an interpreted language, where instructions are provided in the form of a machine-independent bytecode. To execute the bytecode instructions, they must necessarily be processed by the Java Virtual Machine (JVM), which is the Java interpreter. Because of this virtualization, all activities of an application can be checked against a security policy of the Java platform, in the process of interpretation from bytecode into machine code.

It is desirable, in certain cases, to provide the facility to execute native machine-code in an interpreted environment.

This gives rise to the potential security problems associated with native code (described above), since the interpreter no longer has control over the execution process. However, until now, Java platforms have not used an MMU to address these problems.

Even on platforms which include both a Java Virtual Machine and an MMU, the MMU does not provide protection for the interpreted program which called the native code. For example, in a Personal Computer (PC) running a Java application, the MMU is not used to separate the native code from the virtual machine interpreting the byte code. The MMU in the PC regards the native code and the virtual machine as being essentially the same program. This means the code in the native implementation has access to the whole memory of the running virtual machine, because it is owned by the same operating system task. This implies that the native code could harm the whole running process. For PCs this is usually accepted, because the security requirements are relatively less.

Embodiments of the present invention address the security and performance problems of interpreted software programs, such as Java applications. Although the Java language provides for secure programming by not allowing any direct access to resources, this comes at the price of performance. Many algorithms (especially those that are computationally intensive) are much slower when programmed in Java compared to a native language implementation, such as C or assembler. For this reason, standard, commonly-required algorithms are often provided by a Java library for a given platform, which usually contains a native implementation.

Problems arise, however, when a programmer wants to use an existing Java platform, but needs to add a specific algorithm or method that is not already compiled in the Java libraries. An example of such an algorithm might be a proprietary or bespoke cryptographic algorithm. The following competing considerations then arise: adding the algorithm in the Java language makes it too slow to be practical; but adding the algorithm in a native language breaks the security of the Java platform. For Java platforms that do not demand secure operation, the native code approach might be acceptable, in spite of the potential of the native code to functionally influence the whole Java platform. For security-aware platforms, however, just adding a native code implementation is usually not acceptable, for several reasons. Firstly, any third-party certification for the computing platform would be invalidated if native code could be added at will, subsequent to manufacture and certification. However, it would be practically impossible for a hardware vendor to scrutinize the native code developed by each of its customers for potential flaws. Indeed, a customer may not even allow the Java platform vendor to inspect the native code that the customer wants to add. If native code is required, therefore, it would be desirable for the computing device itself to include protection against arbitrary native code functions which are added to the device.

Embodiments of the present invention provide a way for native code to be added to an existing Java platform without compromising the security of the Java platform or any other applications running on it. This is done in such a way that there is no need to disclose (for example) a customer's native code to the platform vendor or to a third-party evaluation or certification agency.

According to embodiments of the invention, a virtualized native execution environment is provided in parallel to the Java execution environment. This virtualized native execution environment allows native functions to be safely added at every stage in the lifecycle of a Java Card. In this virtualized native execution environment it is possible to run native code at the full speed of the native platform, in order to speed up Java applications running on the Java platform. At the same time, the security of the Java platform, its applications, and the underlying physical native platform is guaranteed by the use of a memory management unit, which ensures that only portions of memory owned by the calling Java applet can be accessed by the native method.

Figure 2:
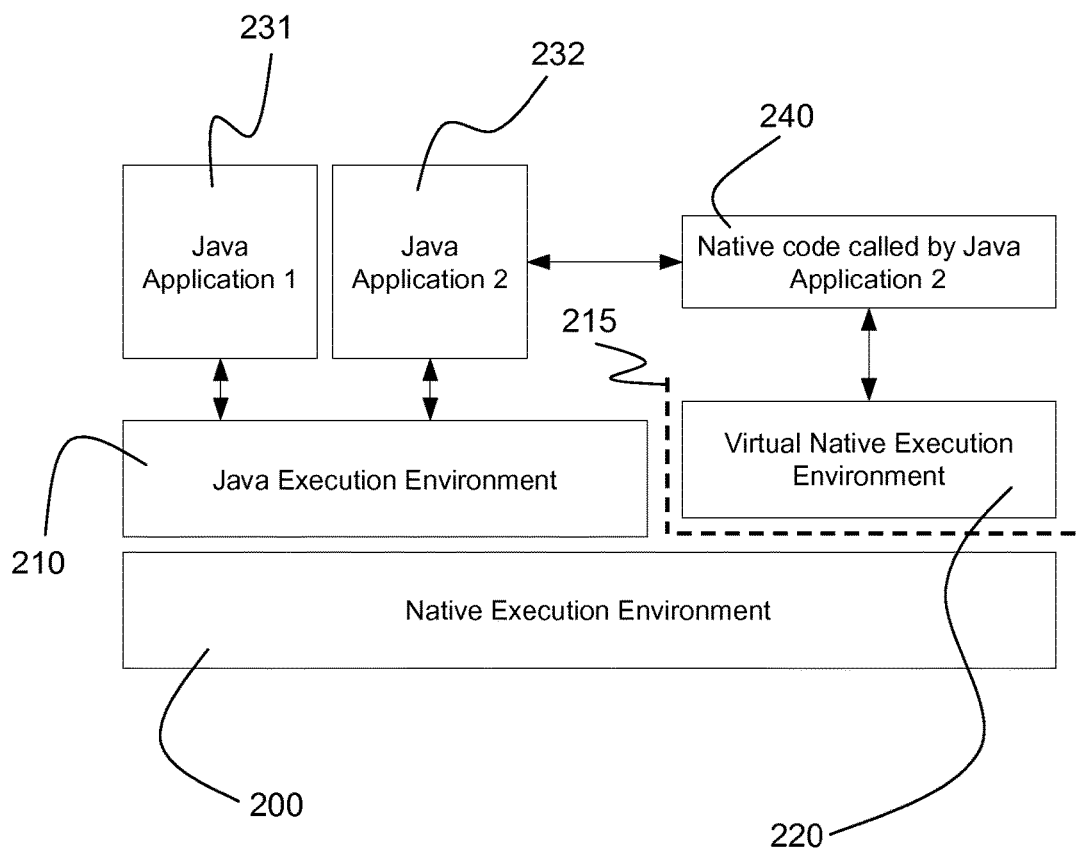
FIG. 2 illustrates the conceptual relationships between the different software components and execution environments according to an embodiment.

FIG. 1 is a simplified block diagram of a computing device operating according to an embodiment. A processor 100 executes the instructions that make up a computer program. Some of this program is provided in the form of Java bytecode. These bytecode instructions are executed by a virtual machine, which is implemented as software also running on the processor. Conceptually, the virtual machine (JVM) running on the processor provides the Java execution environment 210, which is an intermediate layer of software between the Java application 232 and the native execution environment 200. This conceptual relationship is illustrated in FIG. 2. There may be other Java applications 231. The JVM, or interpreter, comprising the Java Execution Environment 210 ensures that each application 231, 232 is protected from the others and that the underlying native execution environment 200 is protected from all of them. Thus any Java application can be safely run, since malicious or badly written code is being executed in a controlled environment. In terms of hardware, the native execution environment 200 includes the processor 100; MMU 110; memory 120; and other resources, such as the peripheral 130.

As part of its program, one of the Java applets 232 calls a function that has been provided in native code 240. Native code comprises machine code using the instruction set of the particular processor 100. Therefore, it is not interpreted by the JVM and hence runs outside of the Java execution environment 210. If the native code 240 were to be run directly on the processor 100 without further controls, it would circumvent the inherent protection mechanisms of the Java environment. For example, the native code 240 would be able to read or write physical memory locations as it wished.

To eliminate this security risk, an MMU 110 is provided. This hardware device is connected between the processor 100 and the memory 120. Therefore, all memory access must be performed using the MMU as a gateway. Requests from the Java bytecode (interpreted via the JVM) can be passed straight through this gateway; however, requests from native code called from the bytecode are controlled. Conceptually, the MMU comprises a hardware firewall 215 (shown as the dashed line in FIG. 2) between the interpreter execution environment of the native code and the other execution environments. The native code is said to execute in a Virtual Native Execution Environment 220. All the other applications and environments are protected from the native code by the MMU acting as a hardware firewall. Other resources, apart from memory, may also be protected by the use of the MMU 110. FIG. 1 shows a peripheral device 130, which is also accessed via the MMU when native code is executed. As for the memory 120, the MMU 110 acts as a hardware firewall between the peripheral 130 and the processor 100 executing the native code.

Figure 3:
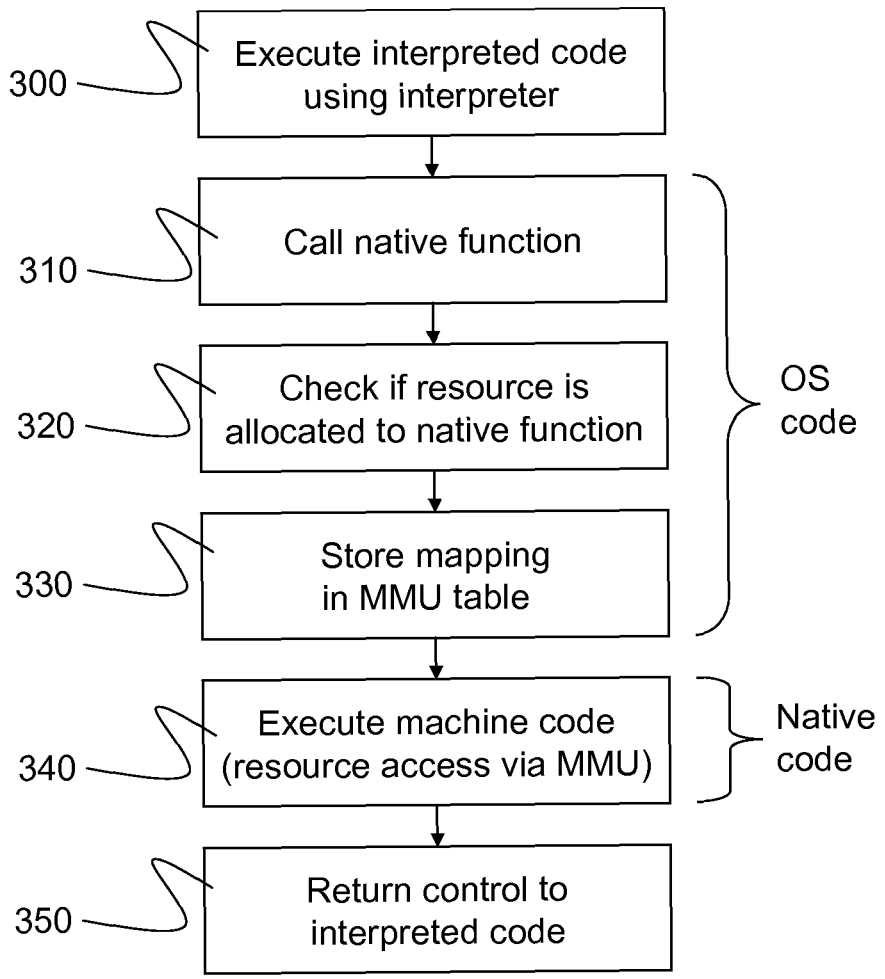
FIG. 3 is a flowchart of a method of executing a program according to an embodiment.

A method for safe execution of native code will now be described with reference to FIG. 3. In step 300, interpreted code (Java bytecode) is being interpreted, as normal, by the interpreter (JVM). Here, memory protection is being provided by the interpreter. In step 310, the interpreted code calls a function that has been provided in native code. This step 310 represents an Operating System (OS) hook to call the native function in a secure environment. For example, the native function may have been written in C, and compiled for the particular processor 100 of the platform for which the program has been developed.

Before passing control to the native code function to begin execution, a call is made to the operating system of the platform to adjust the MMU 110. All resources, such as portions of the memory (and potentially also peripherals) which will need to be accessed by the native code function are passed to the operating system. This may include passing references of data in the native applet and if necessary globally available memory areas. For each such portion of memory (or peripheral), the operating system checks 320 whether the native code is permitted to use the referenced resource. In this way, the method ensures that the native code function will not be able to access memory or peripherals illegally. Provided that the check is successful, a reference to the address and size of the relevant portion of memory (or a reference to the peripheral, respectively) is added 330 to a configuration table in the MMU 110. The format of this lookup table is hardware-platform dependent; however, in general, it will comprise a mapping from virtual memory addresses used by the native code to physical memory addresses in the memory itself and a list of granted and denied accesses to the peripherals of the system. Only memory portions and peripherals that have been mapped in this way will be accessible via the MMU; and, in order to be mapped, the memory and peripherals must have passed the security checks carried out by the operating system. Steps 310 to 330 are performed by Operating System (OS) code.

After initialisation of the lookup table in the MMU, the encapsulated (native) process can start 340. Inside the native-code function, all memory portions and peripherals for which a mapping from virtual to physical addresses has been defined can be accessed and changed. This is achieved by the MMU 110 acting as a gateway to the memory 120 and peripherals 130. Memory access requests, using virtual addresses, are made by the processor (under the control of the native code). The MMU services these requests by translating the virtual addresses into physical addresses and accessing the relevant portion of memory as requested. If a requested virtual address has no mapping defined in the configuration table of the MMU 110, this implies that it is outside the bounds of the memory owned by the calling Java application. In this case, the MMU can throw an exception, for example.

In step 350, the native code has finished executing, and control is returned to the calling (Java) program. After returning from the native method call, all modified data in the relevant memory portions are accessible to the calling application, because this memory was owned by the application to begin with. Step 350, like step 300 relates to interpreted code.

Note that when the Java bytecode is being interpreted by the JVM, the JVM performs the memory (or peripheral) mapping. At this time, the protection function of the MMU could be disabled. For example, in this mode, the MMU may perform a simple pass-through function, rather than mapping the memory addresses as it does when native code is being executed. The same effect could, of course, be achieved by simply providing an alternative communications path directly from the processor to the memory, to physically bypass the MMU in this mode.

Embodiments of the invention provide various advantages—especially in the field of Java-based smart cards.

Java Cards can be extended by proprietary function calls before or after card issuance. For vendors, developing and certifying a Java Card operating system takes long time. Service providers (the customers of the vendors) usually want to bring their product to the market as fast as possible. If the Java Application code is too slow to meet the customer's requirements, an embodiment of the invention can be used to speed up the application runtime. The development process is not influenced by the development of the Java Card as this card is already finished and ready for use.

Java Cards containing unknown third party code can remain certified. Usually, for certification, all source code needs to be available to the evaluator. For commercial reasons, some service providers might not want to disclose their source code at all, but nonetheless want the binary version (native code) to be included in the certified product. Embodiments of the invention allow for this, because it can be guaranteed by means of hardware (MMU) that the unknown third party code cannot cause any security risk to the system or to other applications.

Similarly, the intellectual property of 3rd party software suppliers can be protected—for example, by preserving trade secrets. Some library developers do not release their source code to the vendors of Java Card operating systems or their customers. According to embodiments, the invention allows library developers to adapt or optimise their libraries to fit into the operating system, without losing execution performance and without revealing their source code to the smart card system vendor or other operating system maintainer.

Additionally, embodiments of the invention can allow memory mappings to be adapted to diverse needs of different pieces of software on a given platform. The internal structure of some operating systems may not allow external libraries to be integrated. One reason for this can be that the memory structure assumed by the libraries does not fit into the operating system concept. Embodiments of the invention may allow a memory mapping for library execution that is different to that given by the physical memory layout of the underlying hardware.

This additional use of the MMU relates to the execution of native code which is part of the Java Card OS (and therefore, presumably, not a security risk), but which for technical reasons would need a different address mapping. For Java bytecode, it is not necessary to use the MMU, because all the protection (and mapping) is done by the interpreter—the Java Card Runtime Environment (JCRE). So, all the memory needed is used in one big chunk.

When a library is integrated, it is often written in a way that it uses its own memory model and layout (one that was assumed during library development). One prominent example of such an assumption is that all data is stored starting from memory address 0x00. When two or more different systems of this kind are combined (using direct, physical addressing), they interfere with each other in a way that may produce unexpected, undesirable results (such as two pieces of code using the same memory and disturbing each other). Embodiments of the present invention can also address this problem, due to the virtualisation (and thus effective isolation) of the execution environments for the different libraries.

While the invention has been illustrated and described in detail in the drawings and foregoing description, such illustration and description are to be considered illustrative or exemplary and not restrictive; the invention is not limited to the disclosed embodiments.

For example, it is possible to operate the invention in an embodiment wherein other hardware functionality, such as co-processors or Input/Output (I/O) devices may be accessed by the native code through the MMU. That is, the gateway, or hardware firewall function of the MMU may be used to protect hardware peripherals, as well as memory. The possibilities for accessing other hardware in this way will depend upon the particular MMU and underlying hardware architecture used in a given embodiment, as will be apparent to the skilled person. In this case, the MMU may be renamed as, or supplemented by, a "Resource Management Unit" RMU, for controlling access to the peripherals. References throughout this specification to an "MMU" should therefore be taken to include reference to an "RMU".

The memory 120 described in the preceding exemplary embodiments may comprise any suitable kind of memory, including all kinds of volatile and non-volatile memory. This includes (but is not limited to) electrostatic, magnetic or optical storage means. In the particular case of smart cards, the memory will commonly be semiconductor memory, such as Random Access Memory (RAM) or Electrically Erasable Programmable Read-Only Memory (EEPROM).

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A computing device comprising:
    a memory;
    a processor;
    an interpreter, for controlling the processor to continuously manage the allocation of memory to a program while the program is being executed and to execute the program, the program comprising at least one first instruction in a format that is not native to the processor and configured to call at least one second instruction in machine code that is native to the processor; and
    a Memory Management Unit, hereinafter MMU, adapted to control access by the processor to the memory when the at least one second instruction is executed and to prevent access to a portion of the memory not allocated to the program calling the at least one second instruction when the at least one second instruction is being executed by adding a reference to a table stored in the MMU indicating the size and address of the portion of memory that is accessible to the processor and limiting access to only the portion of the memory referenced in the table;
    wherein the size and address of the portion of the memory not allocated to the program calling the at least one second instruction is adjusted in the MMU when the at least one second instruction is executed and before passing control to the at least one second instruction;
    wherein the interpreter is a Java Virtual Machine and the at least one first instruction comprises Java bytecode;
    wherein the MMU is a hardware device connected between the processor and the memory such that memory access is performed using the MMU as a gateway; and
    wherein the computing device is a Smart card.

2. The computing device of claim 1, wherein the MMU is adapted to control access by the processor to the memory only when the at least one second instruction is executed.

3. The computing device of claim 1, further comprising a peripheral device, wherein the MMU is adapted to control access by the processor to the peripheral when the at least one second instruction is executed and to prevent access to said peripheral if it has been allocated to the interpreter but not allocated to said second instruction.

4. A method of executing a program for a computing device comprising a processor and a memory, the program comprising at least one first instruction in a format that is not native to the processor and calling at least one second instruction in machine code that is native to the processor, the method comprising:
    continuously managing the allocation of memory to the program while the program is being executed;
    interpreting the at least one first instruction using an interpreter and controlling the processor to execute the same; and
    executing the at least one second instruction using the processor, wherein access to the memory is controlled using an MMU, preventing access to a portion of the memory not allocated to the program calling the at least one second instruction when the at least one second instruction is being executed by adding a reference to a table stored in the MMU indicating the size and address of the portion of memory that is accessible to the processor and limiting access to only the portion of the memory referenced in the table;
    wherein the size and address of the portion of the memory not allocated to the program calling the at least one second instruction is adjusted in the MMU when the at least one second instruction is executed and before passing control to the at least one second instruction;
    wherein the interpreter is a Java Virtual Machine and the at least one first instruction comprises Java bytecode;
    wherein the MMU is a hardware device connected between the processor and the memory such that memory access is performed using the MMU as a gateway; and
    wherein the computing device is a Smart card.

5. The method of claim 4, further comprising, before the step of executing the at least one second instruction:
    checking that a portion of the memory to be accessed by the at least one second instruction has been allocated to it; and
    storing in a configuration table of the MMU a mapping for that portion of the memory, which maps from a virtual address requested by the at least one second instruction to a physical address in the memory.

6. The method of claim 4, wherein the step of executing the at least one second instruction comprises:
    accessing a portion of the memory using the MMU, wherein:
        the MMU translates from a virtual address requested by the at least one second instruction to the physical address of the portion in the memory, according to a mapping stored in a configuration table of the MMU; and access is denied by the MMU if the portion of the memory has not been allocated to said at least one second instruction.

7. The method of claim 4, wherein the computing device further comprises a peripheral device and wherein, in the step of executing the at least one second instruction using the processor, access to the peripheral is controlled using an MMU, preventing access to the peripheral if it has been allocated to the interpreter but not allocated to said second instruction.

8. A computer program comprising computer program code means adapted to perform all the steps of claim 4, when said program is run on a computer.

9. A computer program as claimed in claim 8, embodied on a non-transitory computer readable medium.

* * * * *